2 Sheets—Sheet 1.

G. VINCENT.
Car-Truck.

No. 201,311. Patented March 12, 1878.

Witnesses:
H. W. Fanning
J. R. Edry
J. A. Louttel.

Inventor:
George Vincent
Alexander Mason
Attys.

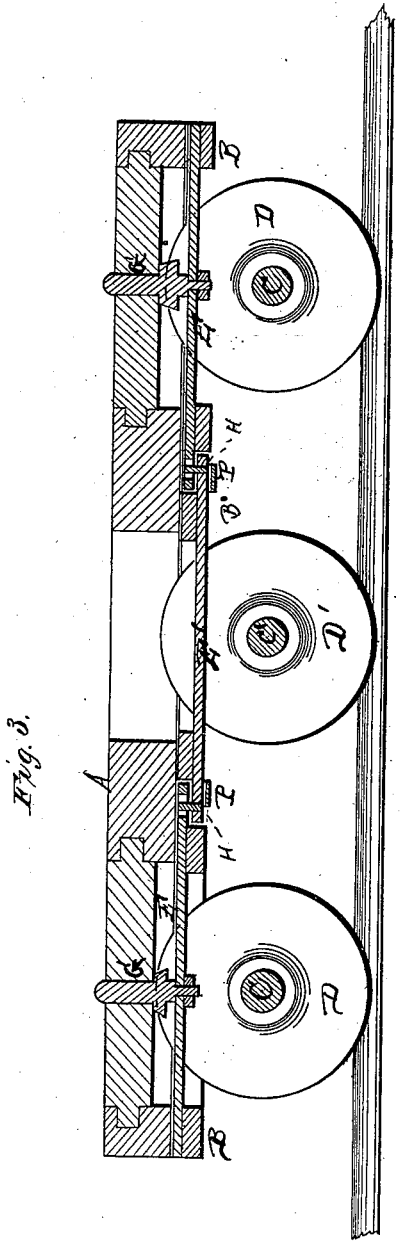

UNITED STATES PATENT OFFICE.

GEORGE VINCENT, OF STOCKTON, CALIFORNIA, ASSIGNOR OF A PART OF HIS RIGHT TO WILLIAM T. BROWNE AND ASA CLARK, OF SAME PLACE.

IMPROVEMENT IN CAR-TRUCKS.

Specification forming part of Letters Patent No. 201,311, dated March 12, 1878; application filed July 7, 1877.

*To all whom it may concern:*

Be it known that I, GEORGE VINCENT, of Stockton, California, have invented a new and useful Improvement in Car-Trucks; and I hereby declare the following to be a description thereof sufficient to enable any person skilled in the art to which it appertains to construct and use the same, reference being had to the accompanying drawings, in which the same letters of reference refer to corresponding parts.

The object of my invention is to construct six-wheeled railroad-trucks, so arranged that the two center wheels and the axle that connects them will automatically move laterally in the truck when it is passing a curve in the track, and at the same time turn the other two axles horizontally, so that they will be nearly or quite in line with the radii of the curve which the truck is passing.

I am aware that such trucks have long been desired by railroad companies, and that attempts have been made to construct them; but all such attempts, so far as I am aware, prior to my invention, have been practical failures, for the reason that the trucks constructed were too complicated or were too uncertain in their operation, or had devices in them of insufficient strength, and too liable to get out of place, and were too costly in construction. For these reasons, among others, all the said trucks have been dangerous or useless, and have not been applied to any considerable extent in practical use, and have failed in supplying the great want for such trucks as I have invented.

In my trucks I use three pairs of ordinary wheels with their axles. I make a secondary frame, with boxes for each axle and pair of wheels, and connect these secondary frames together by a main truck-frame, and also by metal strips or arms attached to the secondary or small frames, and connected with each other, as hereinafter described, by a loosely-jointed connection, which allows the axles to rotate enough to nearly or quite keep in line with the radii of the curve.

Figure 1:
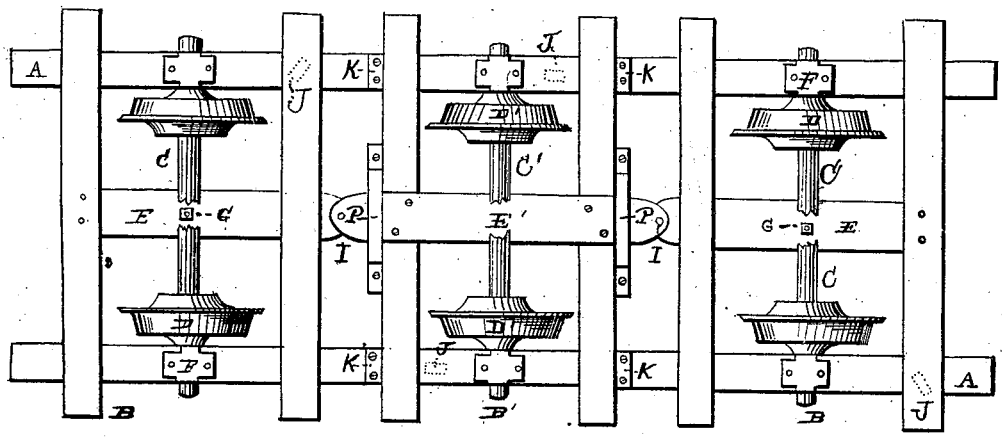
Figure 2:
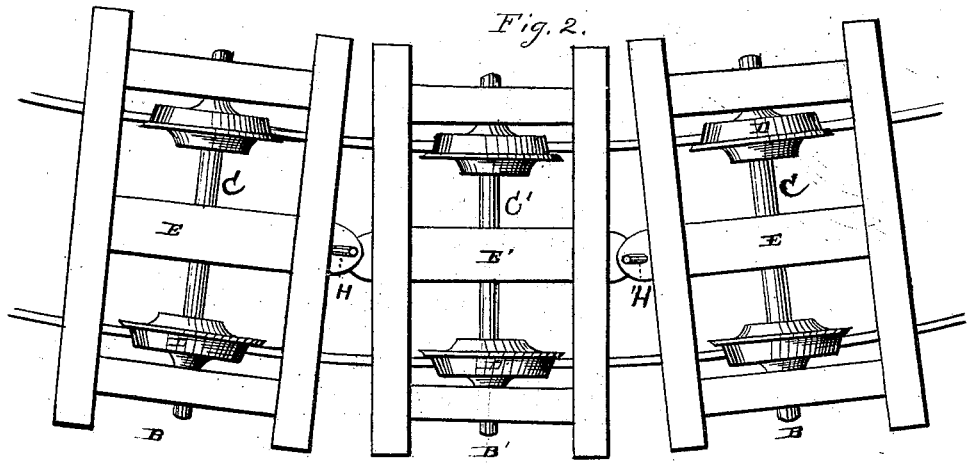

In the drawings, Figure 1 is a bottom view of my truck, showing it in a straight line; and Fig. 2 is a top view of the truck, less the main frame, which is not shown. Fig. 2 shows the relative position and arrangement which the different parts of the truck assume when passing a curve. Fig. 3 is a longitudinal section of my invention.

In the drawings, C C are the first and third axles, carried on ordinary car-wheels, and connected by ordinary boxes F F F F with their secondary frames B B. Longitudinally along the center line of the truck there is fastened to each of the secondary frames B B a strong iron strip, E, which extends from the secondary frame, to which it is attached, toward the center of the truck far enough to form the proper connection with the iron strip E'. C' is the second or middle axle in the truck, and is carried by the wheel D' D', and carries another secondary frame, B'. Longitudinally along the middle of this frame B', and rigidly fastened to it, is a strong iron strip, E'. This strip projects beyond the frame B' far enough on both sides to form the proper connections with the extended ends of the other iron strips, E E.

Attached to the under part of the main frame, on each side of the central truck, is a keeper, P, through which the end of the central strip E' passes, and at each end, on each side of said central truck, is an angular guide-plate, K, to guide the center truck in its lateral movement; and the keepers P also secure the central truck to the main frame.

In each end of the strip E' is placed a strong vertical guide-pin, I. The guide-pins I project through and work in slots H H in the extended ends of the iron strips E E. The guide-pins H H should be at just half the distance between the middle and other axles. The first and third secondary frames are connected to the main truck-frame over the middle of each axle by the pivots G G. Friction-rollers J are interposed at other points where it is thought best by the builder, to let the main truck-frame bear upon the secondary frames.

The middle frame B' is connected with the main frame A by slides, which allow a free lateral movement of the frame B'. By this arrangement the wheels D' D' are left free to follow the railroad-track whether straight or curved.

The operation is as follows: When the truck is running upon a straight track all of the wheels remain in line; but when it passes upon a curve the forward wheels, in following the track, turn out of a straight line, carrying the forward end of the truck with them. This causes the flanges of the middle wheels D' D' to impinge laterally against the inside of the rail on which it is running, and thereby press the middle frame B' B' laterally toward the periphery of the curve. This lateral movement of B' B' carries the guide-pins I I also toward the outside or periphery of the curve, and with them the extended ends of the two iron strips E E, attached to the first and third secondary frames B B, and thus the first and third axles and frames B B are partially revolved horizontally around the pivots G G, so as to throw all the wheels on a line with the curve of the track and the axles on a line with the radii of the curve.

This construction of the trucks makes them positive and certain in their operation, and their connecting and operating devices are in such relative positions that they are easily made of ample strength and firmness, and at the same time operate with great ease, freedom, and safety.

Having thus described my invention, what I claim, and desire to secure by Letters Patent, is—

1. The combination of the pivots G G, connecting the secondary frames B to the main frame, the guide-pins I I, and the plates E, provided with slots H, substantially as and for the purposes herein set forth.

2. In combination with the main frame A, provided with the keepers P P and guide-plates K, the secondary frames B B and B', connected together and operating substantially as described.

GEORGE VINCENT. [L. S.]

Witnesses:
H. M. FANNING,
J. R. COVY,
J. A. LOUTTIL.